Mar. 20, 1923.
H. SPURRIER
MEANS FOR DETERMINING CERTAIN QUALITIES OF FLUIDS
Filed Feb. 24, 1919   2 sheets-sheet 1
1,449,153
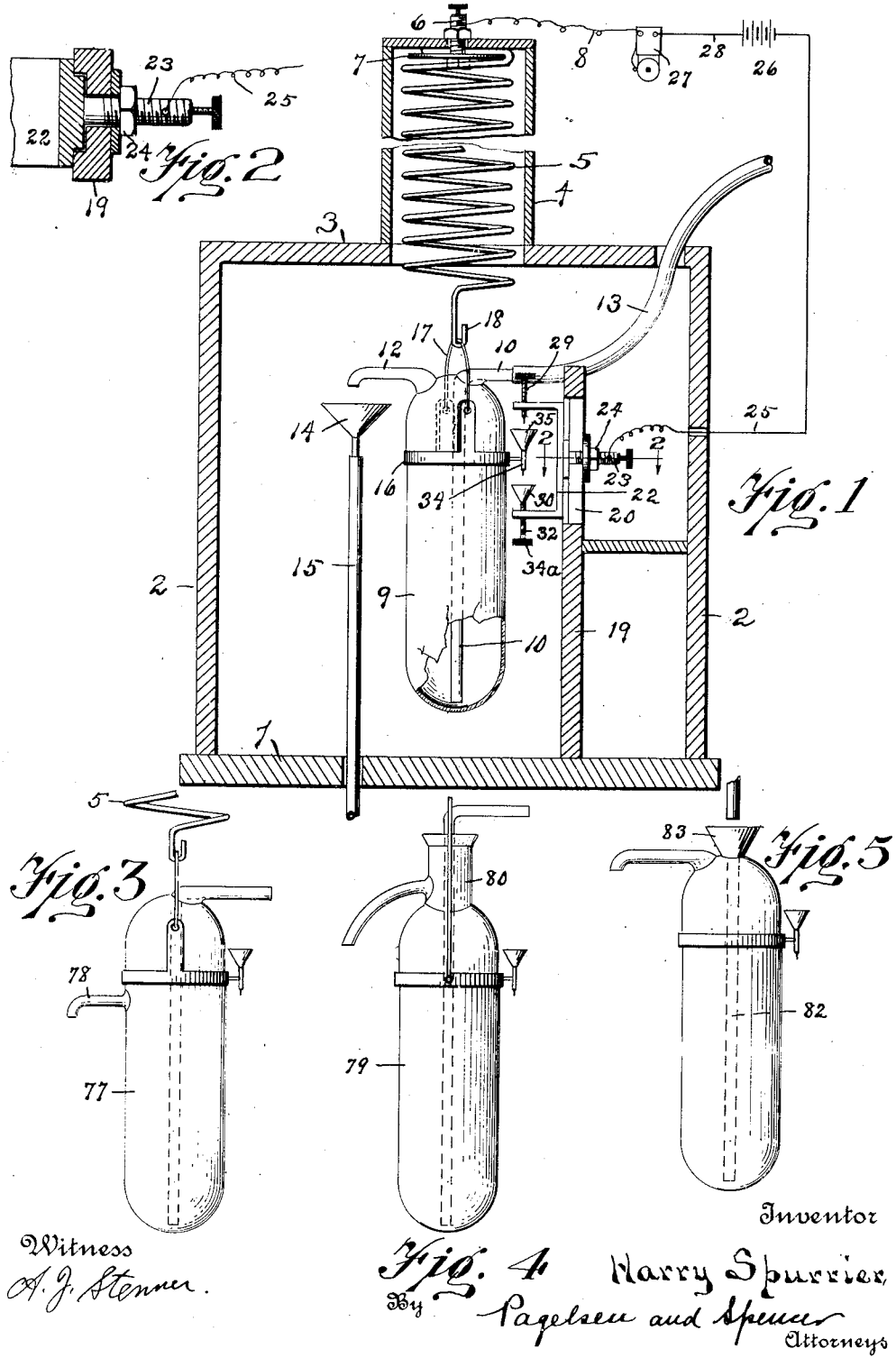

Mar. 20, 1923.                                                1,449,153
                    H. SPURRIER
         MEANS FOR DETERMINING CERTAIN QUALITIES OF FLUIDS
              Filed Feb. 24, 1919           2 sheets-sheet 2
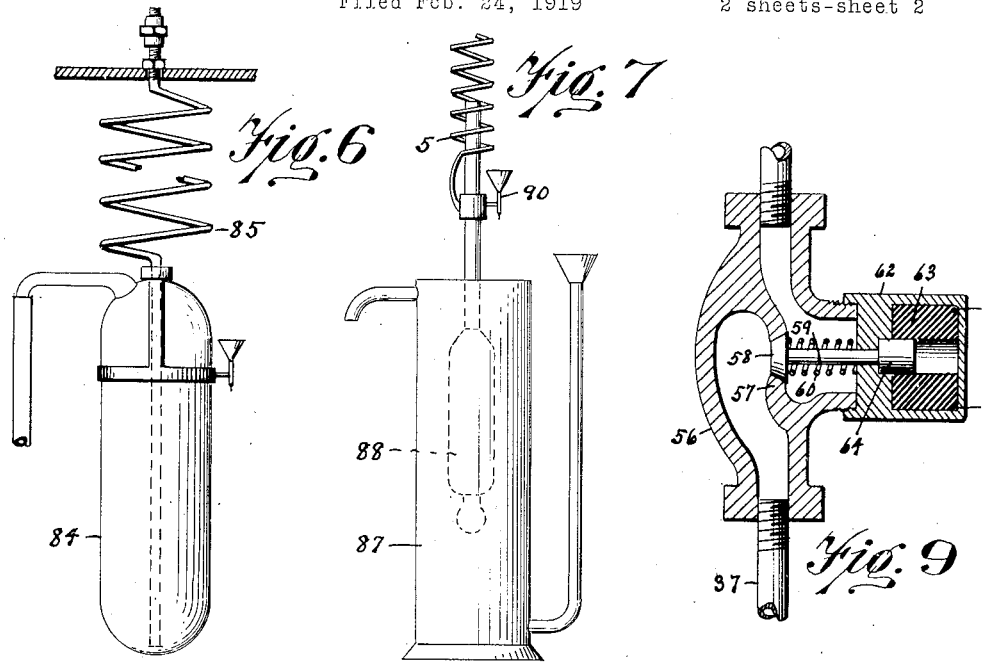
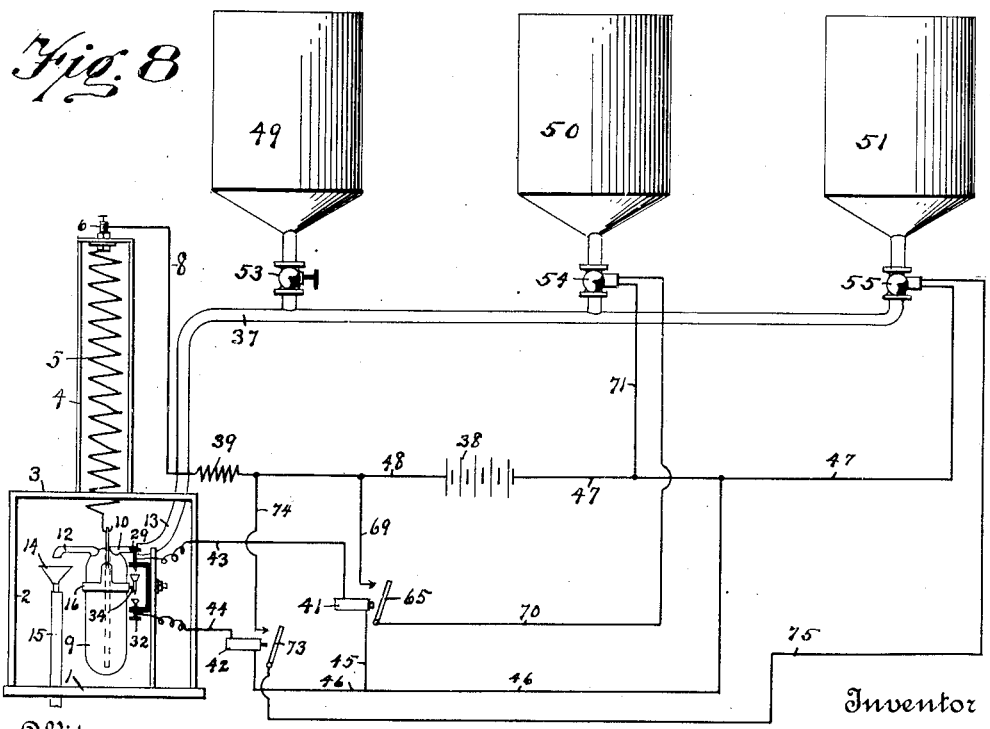

Patented Mar. 20, 1923.

1,449,153

UNITED STATES PATENT OFFICE.

HARRY SPURRIER, OF DETROIT, MICHIGAN.

MEANS FOR DETERMINING CERTAIN QUALITIES OF FLUIDS.

Application filed February 24, 1919. Serial No. 278,963.

*To all whom it may concern:*

Be it known that I, HARRY SPURRIER, a subject of the King of Great Britain, and residing at Detroit, in the county of Wayne and State of Michigan, have invented a new and Improved Means for Determining Certain Qualities of Fluids, of which the following is a specification.

This invention relates to means for determining certain qualities of fluids, including both liquids and gases, such as their specific gravity and fluidity or viscosity, and the object of this invention is to provide a device whereby such qualities may be determined while the fluids are in motion.

This invention consists in a receptacle through which the fluid may flow, means connected to the receptacle, which means will respond to an increase or decrease in the weight of the receptacle and its contents, and electrical circuits which will be opened or closed according to such variations in weight of the receptacle. It further consists in a plurality of containers connected to said receptacle, at least one of which is provided with a valve which may be opened and closed according to the variations in weight of said receptacle. It also consists in the details of construction illustrated in the accompanying drawings and particularly pointed out in the claims.

In the accompanying drawings, Fig. 1 is a sectional view of a case and a front elevation of the means for determining variations in weight of a receptacle and its contents. Fig. 2 is a section on the line 2—2 of Fig. 1. Figs. 3 to 6 inclusive are elevations of modified forms of receptacles. Fig. 7 is an elevation of a modified form of receptacle especially adapted to determine variations in the specific gravity of a liquid in motion. Fig. 8 is a conventional elevation of an installation embodying this general invention. Fig. 9 is a section of a valve.

Similar reference characters refer to like parts throughout the several views.

In manufacturing operations, it is often very desirable to know that the density, viscosity or specific gravity of gases and of liquids such as solvents, glazes and sizes, remains constant, and means to indicate any variation therein are of great value. The changes in the density or specific gravity may be determined by the variations in the weight of the contents of a container, and I have therefore provided a receptacle having proper inlet and outlet passages so that the receptacle will contain a fixed quantity of the fluid being observed, and resilient means, preferably a coil spring, to support this receptacle, although the computing scale art will supply many effective substitutes for this spring.

Referring to Fig. 1, a base 1 supports a case provided with sides 2 and a top 3. A tube 4 supports the upper end of a spring 5 by means of a bolt 6 and washer 7, while an electrical conductor 8 connects to the bolt. A receptacle 9 of glass, metal or any other desirable material is preferably formed with an inlet passage 10 and an outlet passage 12. A flexible hose 13 may be employed to convey the fluid to the receptacle and where non-volatile liquids are being observed, a funnel 14 at the upper end of the pipe 15 may be supplied to receive the liquid flowing from the receptacle.

If the specific gravity of the fluid changes, the weight of the receptacle 9 and its contents will vary with it. A band 16 of metal is secured around the receptacle and a bale 17 connects thereto and engages the hook 18 at the lower end of the spring 5. As the weight of the receptacle and its contents increases or decreases, the spring will stretch or contract.

A post 19 is shown with a slot 20 in which a bracket 22 is adjustably supported, a bolt 23 thereon being engaged by a nut 24. A circuit wire 25 extends from this bolt to a current source 26 and a signal 27 may be connected to the current source by a wire 28 and to the bolt 6 by means of the wire 8.

This bracket 22 carries two contact points, 29 and 30, the former preferably a screw and the latter a cup to hold mercury mounted on a screw threaded stem 32 having a handle 34ª at its lower end. A contact stem 34 may be mounted on the band 16 and a cup 35 for mercury may be mounted on this stem.

When liquid of uniform specific gravity flows through the hose 13 and inlet tube 10 into the receptacle 9 and out through the spout 12, the position of the receptacle will not change. But should the specific gravity of the liquid vary, as when glazes become too thick or solutions contain too much or too little solvents, the receptacle will move up or down and establish a connection to the signal 27. Proper steps may then be taken to bring matters back to normal. The permissible variation can always be determined by the distance between the contacts 29 and 30.

In Fig. 8 an installation is diagrammatically shown for regulating the density or specific gravity of a liquid flowing through the pipe 37 to the receptacle 9. The parts shown in Fig. 1 are repeated with the exception of the signal 27 and the contacts. The wires 8 and 48 connect to a current source 38, a resistance 39 preferably being used to reduce the current passing the contact points. The contacts 29 and 30 are insulated and connect to relays 41 and 42 by wires 43 and 44. The relays connect to the current source by means of wires 45, 46 and 47.

Receptacles 49, 50 and 51 connect to the pipe 37 by means of valves 53, 54 and 55 respectively, the valve 53 being preferably an ordinary hand operated device, while the valves 54 and 55 may be constructed as shown conventionally in Fig. 9. This body 56 has a seat 57 for the disk 58 on a stem 59, a spring 60 normally holding the disk against its seat. A cap 62 carries the solenoid winding 63 and the stem 59 carries an armature 64. When the winding is energized, the disk 58 will be lifted from its seat.

When the receptacle reaches the upper limit of its movement, the armature 65 will be attracted by the relay 41 to close the circuit to the valve 54, this circuit consisting of the wires 48, 69, 70, 71 and 47. When the armature 73 is attracted by the relay 42, it closes the circuit to the valve 55 which consists of the wires 74, 75 and 47. The result is that when the weight of the receptacle 9 and its contents received from the tank 49 falls below a certain predetermined point, the receptacle will rise sufficiently to bring the contacts 35 and 29 together, causing the relay 41 to be energized and the valve 54 to be opened, which will permit the contents of the tank 50 to mix with the contents of the tank 49 in the pipe 37 and continue to flow until the weight of the receptacle is again above the minimum limit. Similarly, when the maximum limit of weight is reached, the valve 55 will open. The contents of the tanks 50 and 51 will preferably be respectively somewhat above and somewhat below the contents of the tank 49 in specific gravity. The character of the liquid passing through the receptacle 9 can therefore be quite accurately controlled.

Where the viscosity of the liquid is to be controlled, as in glazes and sizes, a receptacle 77 such as shown in Fig. 3 may be employed. In this the outlet passage 78 is rather low and with normal liquid a predetermined height of liquid above this spout will be maintained. But should the liquid become more free-flowing than desired, the height above the spout will decrease and the weight of the receptacle and its contents will decrease. Should the liquid become less free-flowing, it will gather in a greater quantity above the spout 78 and the receptacle will stretch the spring 5 a greater distance. The construction shown in Fig. 8 may be utilized in combination with this receptacle.

In Fig. 4 the receptacle 79 is provided with a neck 80 in which the liquid may gather when its ratio of flow diminishes as just described. In Fig. 5, the inlet passage 82 has a funnel 83 so that the friction of the flexible feed hose 13 may be eliminated. This modification is adapted for testing non-volatile liquids which will corrode rubber and metals.

The receptacle 84 in Fig. 6 is shown suspended from its feed pipe 85 which is in the form of a resilient helix and which will vary in length as the receptacle and its contents vary in weight. This modification is particularly adapted for gases and liquids which corrode rubber but do not corrode metal.

In the devices above described, the receptacle for the fluids is movably mounted. In Fig. 7, however, the receptacle 87 is stationary while a float 88 is suspended by the spring 5 and carries a contact 90 of any desired construction. As the specific gravity in the receptacle 87 increases the float 88 will rise, but fall as the specific gravity decreases. The spring 5 before described will support the float and the contact 90 thereon will coact with the other contacts shown in Figs. 1 or 8 for the purposes there disclosed.

In all these devices, the proportions and sizes may all be varied without departing from the spirit of my invention as set forth in the following claims.

I claim:

1. The combination of a fluid receptacle having an inlet connection and overflow connection whereby the volume of fluid content of the receptacle is kept constant, resilient means to support the receptacle, and an electric circuit adapted to be closed when the receptacle and its contents attain a predetermined maximum weight.

2. The combination of a fluid receptacle having an inlet connection and overflow connection whereby the volume of fluid content of the receptacle is kept constant, resilient means to support the receptacle, and an electric circuit adapted to be closed when the receptacle and its contents attain a predetermined minimum weight.

3. The combination of a fluid receptacle having inlet and outlet connections, resilient means to support the receptacle, and a plurality of electric circuits, one adapted to be closed when the receptacle and its contents attain a predetermined minimum weight and the other adapted to be closed when the receptacle and its contents attain a predetermined maximum weight.

4. The combination of a fluid receptacle having inlet and outlet connections which convey constantly flowing fluid through said receptacle, a spring to so support the receptacle as to permit its position to change with the weight of fluids therein, a pair of electric contacts and electric circuits connected thereto, said contacts being so positioned that they will engage when the fluid within the receptacle attains a predetermined maximum weight, a second pair of electric contacts and electric circuits connected thereto, said second contacts being so positioned that they will engage when the fluid within the receptacle attains a predetermined minimum weight.

5. The combination of a receptacle and means for continuously conveying fluids to said receptacle to maintain a constant predetermined volume therein and means for conveying the surplus fluid from said receptacle, a spring adjacent the receptacle, an electric circuit, and means connected to said spring and adapted to move as the weight of the fluid varies within the receptacle to open and close said electric circuit.

6. The combination of a receptacle having an inlet passage extending to the bottom thereof and an outlet passage connecting to the top thereof, which passages convey constantly flowing fluid into and from said receptacle respectively to maintain a constant volume therein, a spring to support the receptacle, an electric contact member mounted on the receptacle, and a pair of adjustable contact members mounted one above and the other below the contact member on the receptacle and so positioned that an electric circuit will be closed when the weight of the receptacle and its contents reaches a maximum or a minimum limit respectively.

HARRY SPURRIER.